(12) United States Patent
Morgenstern (10) Patent No.: US 9,586,505 B2
(45) Date of Patent: Mar. 7, 2017

(54) HARNESS TENSIONER FOR CHILD SAFETY SEAT

(71) Applicant: GRACO CHILDREN'S PRODUCTS INC., Atlanta, GA (US)

(72) Inventor: Matthew Alan Morgenstern, Coatesville, PA (US)

(73) Assignee: Graco Children's Products Inc., Atlanta, GA (US)

( * ) Notice: Subject to any disclaimer, the term of this patent is extended or adjusted under 35 U.S.C. 154(b) by 195 days.

(21) Appl. No.: 14/216,164

(22) Filed: Mar. 17, 2014

(65) Prior Publication Data

US 2014/0265489 A1 Sep. 18, 2014

Related U.S. Application Data

(60) Provisional application No. 61/800,960, filed on Mar. 15, 2013.

(51) Int. Cl.
*B60N 2/28* (2006.01)

(52) U.S. Cl.
CPC ......... *B60N 2/2812* (2013.01); *B60N 2/2806* (2013.01); *B60N 2/2851* (2013.01)

(58) Field of Classification Search
CPC ... B60N 2/2812; B60N 2/2806; B60N 2/2851

USPC ............................................ 297/484, 216.11
See application file for complete search history.

(56) References Cited

U.S. PATENT DOCUMENTS

| | | | | |
|---|---|---|---|---|
| 4,886,315 A * | 12/1989 | Johnson | ............... | B60N 2/2812 297/484 |
| 6,491,348 B1 * | 12/2002 | Kain | .................... | B60N 2/2812 297/484 |
| 8,469,400 B2 * | 6/2013 | Merrill | ..................... | B60N 2/24 297/484 |
| 8,622,478 B2 * | 1/2014 | Spence | ............... | B60N 2/2812 297/484 |

FOREIGN PATENT DOCUMENTS

FR WO 2013050610 A1 * 4/2013 ........... B60N 2/2806

* cited by examiner

*Primary Examiner* — Anthony D Barfield
(74) *Attorney, Agent, or Firm* — Sutherland Asbill & Brennan LLP (57) ABSTRACT

A harness tensioner for a child safety seat has a lower lever part pivotable about an axis and an upper lever part above the lower lever part and pivotable about a different axis. A lower portion of the upper lever part contacts with an upper portion of the lower lever part. Harness straps of a child safety seat are coupled to the upper lever part. Upon an impact event, the lower part is moved against a biasing force, which in turn moves the upper part to apply rearward tension to the harness straps.

17 Claims, 9 Drawing Sheets

HARNESS TENSIONER FOR CHILD SAFETY SEAT

RELATED APPLICATION DATA

This patent is related to and claims priority benefit of U.S. provisional application Ser. No. 61/800,960 filed Mar. 15, 2013 and entitled "Harness Tensioner for Child Safety Seat. The entire content of this prior filed application is hereby incorporated herein by reference.

BACKGROUND

1. Field of the Disclosure

The present disclosure is generally directed to children's car seats and safety seats, and more particularly to a tensioning device that is mechanically activated upon an impact event to apply tension to the shoulder straps of the seat harness system.

2. Description of Related Art

Child car seats and safety seats are known in the art. The typical seat of this type has a plastic shell that defines the child seat. These types of seats are provided with a dedicated harness system to secure the child seat occupant in the seat. The child seat is anchored to a dedicated vehicle seat in a vehicle. Sometimes, the child seat is provided with fixed anchor belts and the vehicle is provided with fixed anchor points. The anchor belts are connected to the fixed anchor points to anchor the child seat in place on the vehicle seat. However, often a child safety seat is secured in place by using the vehicle's own safety harness system. During a crash event, the safety seat is held in place by the anchoring belts, whether the vehicle belts are used or dedicated anchor belts are used.

These types of child safety seats are thus held fast to the vehicle seat during the impact event. The child seat occupant on the other hand tends to accelerate away from the seating surface of the child safety seat and is held in place only by the dedicated safety harness provided on the child safety seat. Forward head excursion occurs during the crash event, which is an undesirable consequence of such an impact event. Head excursion and the consequences suffered from same can be magnified by forward excursion of the seat occupant's body relative to the seating surface of the child safety seat. Anything that can be done to minimize forward head excursion, including reducing forward body excursion, can reduce the degree of trauma and injury that might otherwise be suffered by the child during a crash or impact event.

SUMMARY

In one example according to the teachings of the present disclosure, a harness tensioner for a child safety seat has a lower lever part pivotable about an axis, an upper lever part above the lower lever part and pivotable about a different axis, and a lower portion of the upper lever part in contact with an upper portion of the lower lever part. Harness straps of a child safety seat are coupled to the upper lever part. Upon an impact event, the lower part is moved against a biasing force, which in turn moves the upper part to apply rearward tension to the shoulder straps.

In one example, the upper lever part can be an upper toggle lever pivotally mounted on an upper pivot rod and the axis can be an upper horizontal pivot axis defined by the upper pivot rod.

In one example, the upper lever part can have two U-shaped channel sections that are laterally spaced apart. Each U-shaped channel section can have a strap slot near a top end. The harness straps can be routed through the strap slots.

In one example, the lower lever part can be a lower toggle lever pivotally mounted on a lower pivot rod and the different axis can be a lower horizontal pivot axis defined by the lower pivot rod.

In one example, the upper lever part can have an upper leg above the axis, a lower leg below the axis, and strap slots near a top end of the upper leg. The harness straps can be routed through the strap slots.

In one example, the upper lever part can be an upper toggle lever pivotally mounted on the axis and can have two U-shaped channel sections that are laterally spaced apart. The upper leg can be defined by an upper portion of each U-shaped channel section above the axis and the lower leg can be defined by a lower portion of each U-shaped channel section below the axis. One of the strap slots can be provided in the upper portion of each U-shaped channel section.

In one example, the lower lever part can have an upper leg above the different axis, a lower leg below the different axis, and a pressure pad provided on the lower leg. The vehicle harness belt can be arranged to contact the pressure pad.

In one example, the lower lever part can be a lower toggle lever pivotally mounted on the different axis and can have a top segment extending between and connecting respective top ends of two laterally spaced apart side segments. The pressure pad can be connected to and extend between respective lower ends of the two side segments.

In one example, the harness tensioner can have a biasing mechanism in contact with one of the upper and lower lever parts and provide the biasing force.

In one example, the harness tensioner can have a compression spring with one end in contact with a fixed plate and an opposite end in contact with a portion of the lower lever part to produce the biasing force.

In one example, a vehicle harness belt of a vehicle can be coupled to the lower part and the lower part can be moved by the vehicle harness belt during the impact event.

In one example according to the teachings of the present disclosure, a harness tensioner for a child safety seat has two levers pivotally mounted to a car seat and harness shoulder straps coupled to one of the two levers. A biasing mechanism is adapted to bias the harness tensioner to a relaxed state. The other of the two levers is moved upon an impact event which in turn moves the one of the two levers thereby applying tension to the shoulder straps.

In one example, the one lever can be an upper toggle lever mounted on a horizontal upper pivot rod and the other lever can be a lower toggle lever mounted on a horizontal lower pivot rod below the upper toggle lever. The vehicle harness straps can be coupled to an upper leg of the upper toggle lever.

In one example, a lower leg of the one lever can contact an upper leg of the other lever and the biasing mechanism can contact a lower leg of the other lever.

In one example, the biasing mechanism can be a spring mounted between two segments of a lower leg of the other lever.

In one example, a vehicle seat harness strap can be coupled to the other of the two levers and can move the other of the two levers as a result of the impact event.

In one example according to the teachings of the present disclosure, a child safety seat has a seat shell, a harness system with shoulder straps, a lower lever part mounted to the shell and pivotable about a lower axis, and an upper lever part mounted to the shell above the lower lever part and pivotable about an upper axis above the lower axis. A lower leg of the upper lever part and an upper leg of the lower lever part are in contact with one another. A vehicle harness is belt coupled to the lower lever part. The shoulder straps are coupled to the upper lever part whereby, upon an impact event, the vehicle harness belt moves the lower lever part against a biasing force, which in turn drives movement of the upper lever part to apply tension to the shoulder straps.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed harness tensioning device solves or improves upon one or more of the above noted and/or other problems and disadvantages with prior known car seats and child safety seats. In one example, the disclosed harness tensioning device can reduce forward excursion of a child seat occupant in a crash or impact event. In one example, the disclosed harness tensioning device activates mechanically upon a crash or impact event to pull on the shoulder straps of the seat's dedicated harness system. In one example, the disclosed harness tensioning device activates automatically to pull on the shoulder straps of the seat's dedicated harness system. In one example, the disclosed harness tensioning device employs a dual lever arrangement to activate. In one example, the disclosed harness tensioning device is activated by the vehicle seat's lap belt during an impact or crash event. These and other objects, features, and advantages of the present disclosure will become apparent to those having ordinary skill in the art upon reading this disclosure.

In one example according to the teachings of the present disclosure, a harness tensioner for a child safety seat can have two levers that are pivotally mounted to a car seat. Harness shoulder straps on the car seat can be coupled to one of the two levers. A vehicle seat harness strap can be coupled to the other of the two levers. A biasing mechanism can be adapted to bias the harness tensioner to a relaxed state. The vehicle seat harness strap can move the other of the two levers to an activated state upon an impact event which in turn can move the one of the two levers applying tension to the shoulder straps. The other of the levers can be a lower lever part pivotable about an axis and the one of the levers can be an upper lever part above the lower lever part and pivotable about a different axis. A lower portion of the upper lever part can contact an upper portion of the lower lever part. The car seat harness straps can be coupled to the upper lever part and the vehicle seat harness strap can be coupled to the lower part. A child safety seat can have a seat shell and carry the car seat harness straps. The harness tensioner can be mounted to the car seat.

Figure 1:
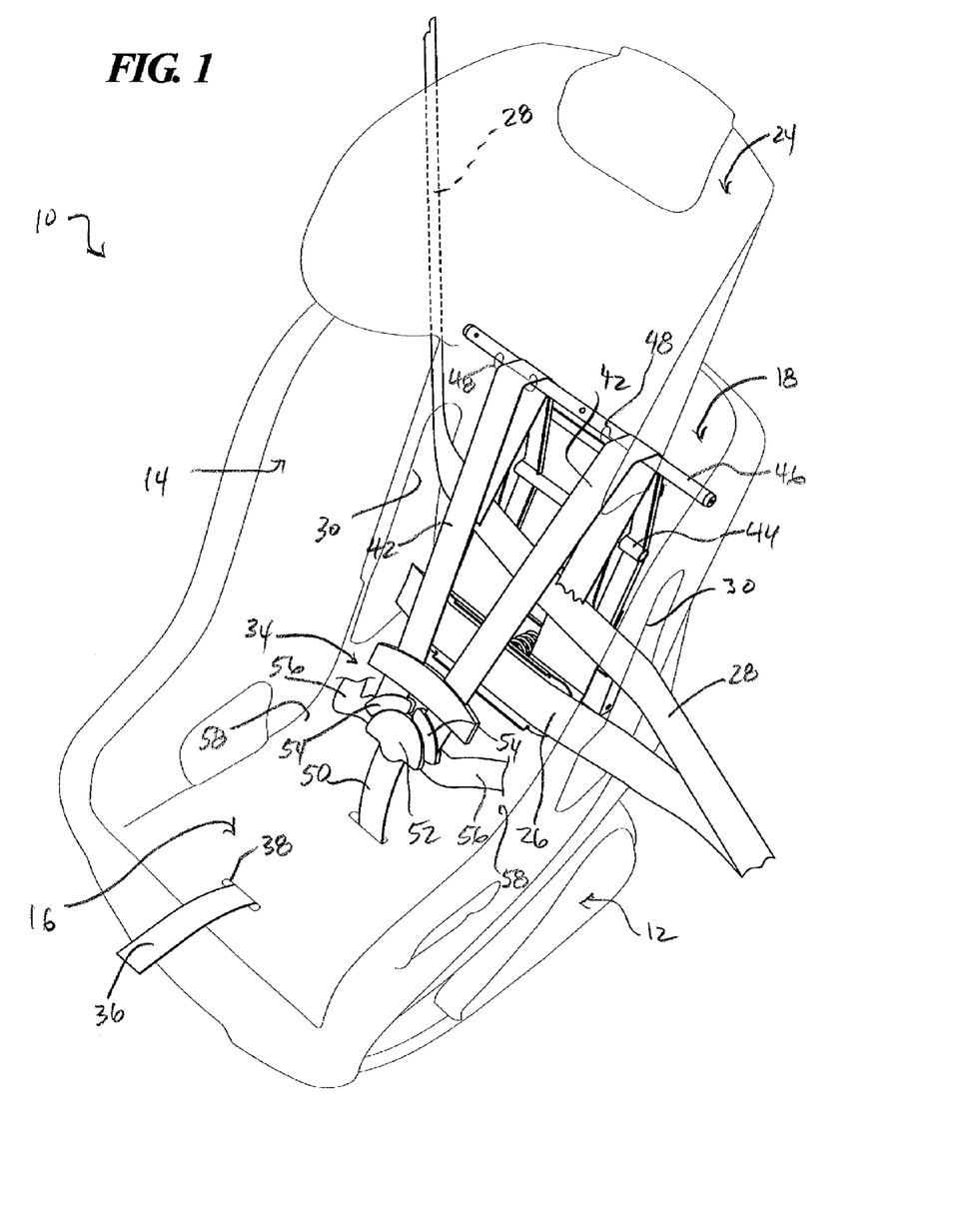
FIG. 1 shows a front perspective view of one example of a car seat or child safety seat with a harness system and a harness tensioning device constructed in accordance with the teachings of the present invention.
Figure 2:
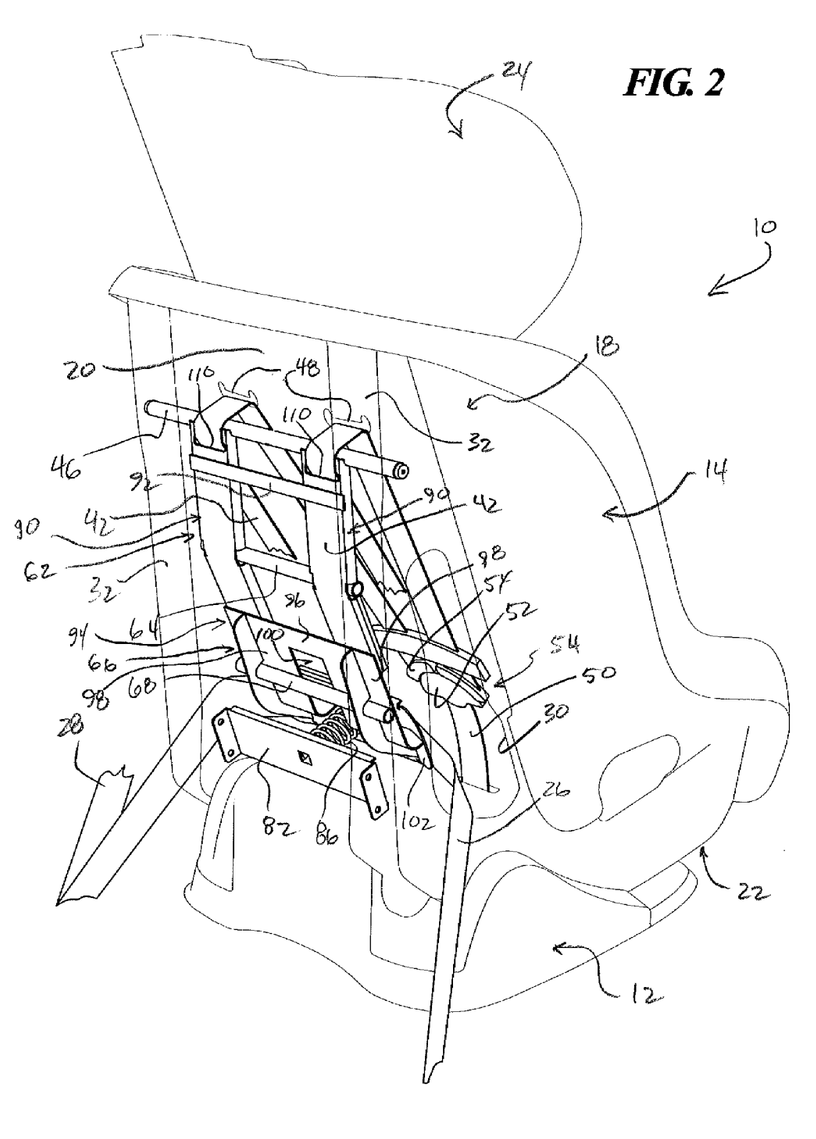
FIG. 2 shows a rear perspective view of the car seat and the harness system and harness tensioning device shown in FIG. 1 in a normal operating configuration.
Figure 3:
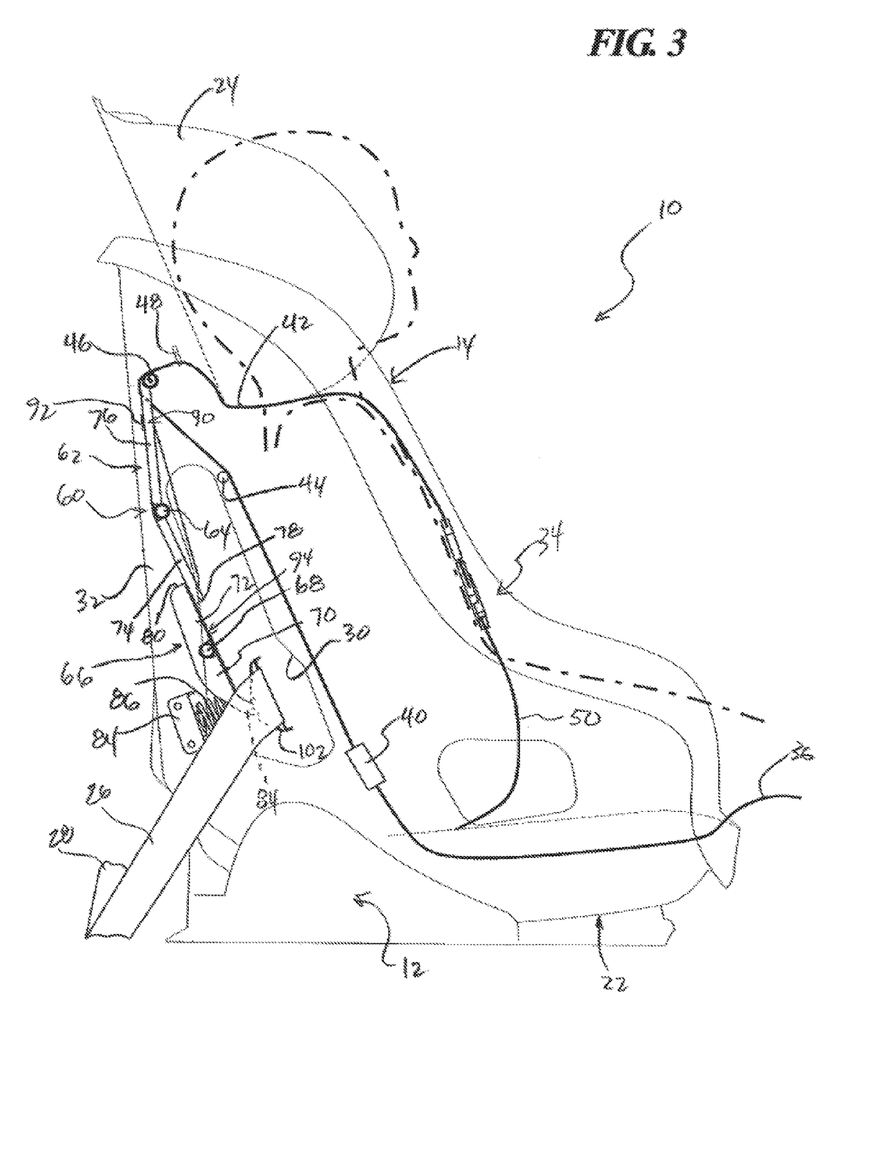
FIG. 3 shows a side view of the car seat of FIGS. 1 and 2 with a child seated in the seat and the harness system and harness tensioning device in the normal operating configuration.

Turning now to the drawings, FIGS. 1-5 show one example of a child safety seat or car seat 10 constructed in accordance with the teachings of the present invention. In this example, the car seat 10 has a seat base 12 supporting a conventional plastic seat shell 14 as shown in FIG. 1 and as is known in the art. The seat shell 14 has a front side forming a seating surface with a seat bottom 16 and a seat back 18. A shown in FIG. 2, the seat shell has a back side 20 behind the seat back 18. As shown in FIG. 3, the seat shell 14 has an underside 22 beneath the seat bottom 16. In the disclosed example, the car seat 10 also has a headrest 24 that is coupled to and optionally height adjustable on the seat back 18. The basic configuration and construction of the car seat 10 noted above are well known. The characteristics of the car seat 10 including the size, shape, function, material selection, structure, and the like of the base 12, the seat shell 14, and the headrest 24 can vary considerably and function as intended.

As shown in FIG. 1, the car seat 10 can be anchored to a vehicle seat (not shown) using the vehicle's dedicated harness strap. The strap includes a lap belt 26 and a shoulder strap 28 connected to one another at a buckle or latch (not shown) as is known in the art. The strap and buckle can be routed through openings 30 in a pair of spaced apart vertical supports 32 that are provided on and protruding behind the back side 20 of the seat back 18. Thus, the vehicle harness strap and buckle are routed behind the seat back 18, as shown in FIGS. 2 and 3, but still connect the car seat 10 to the vehicle seat. In this way, the car seat 10 is anchored to the vehicle seat. The supports 32 can be metal or plastic but are sturdy structural elements that impart strength and rigidity to the car seat 10.

As shown in FIGS. 1-3, the car seat 10 also has its own dedicated harness system 34, which can have a relatively conventional arrangement. In this example, the harness system 34 has an adjuster strap 36 protruding through the forward end of the seat bottom 16. Though not shown, the adjuster strap 36 is typically routed through a releasable lock-off mechanism at an opening 38 in the seat bottom. The lock-off mechanism is configured to selectively allow the adjuster strap to be paid out or to be retracted as desired in order to adjust the length and tension in the harness system. The mechanism is also configured to selectively prevent the adjuster strap 36 from at least being retracted. As shown in FIG. 3, the adjuster strap 36 extends along the underside 22 of the seat bottom 16 to the back side 20 of the seat back 18. The adjuster strap 36 is typically connected to a splitter plate 40 located behind the back side 20 of the seat back 18.

With reference to FIGS. 2 and 3, two side-by-side shoulder straps 42 of the harness system 34 are also connected to the splitter plate 40 and are routed upward along the back side 20 of the seat back 18. The seat back 18 carries two routers or guide bars including a lower guide bar 44 and an upper guide bar 46 above the lower guide bar. The shoulder straps 42 are routed by the lower guide bar 44 so as to remain close to the back side 20 of the seat back 18 in this example. The shoulder straps 42 are routed upward and rearward from the lower guide bar 44 to and around the upper guide bar 46. The shoulder straps 42 are then directed forward from the upper guide bar 46 through holes 48 in the seat back 18 to the front side of the seat shell 14. The shoulder straps 42 then extend down toward the seat bottom.

A crotch strap 50 is fixed below and extends through the seat bottom 16 and upward from the seat bottom. A free end of the crotch strap 50 carries a buckle or latch 52. The shoulder straps 42 carry connectors 54 that can connect to the buckle or latch 52 as is known in the art. The shoulder straps 42 can continue beyond the connectors 54 and form separate lap straps 56. The lap straps 56 continue in opposite directions and can be attached to or buckled in a known manner near the respective opposed sides 58 of the seat bottom 16 on the seat shell 14.

As with the seat shell, base, and headrest construction, specific details of the harness system 34 can also vary in configuration and construction from the example shown and described herein. FIG. 1 shows the portions of the harness system 34 positioned on the front side of the seat shell 14 and in a latched and in use arrangement, as if a child were seated and secured in the car seat 10. FIG. 2 shows the portions of the harness system 34 positioned on the back side 20 of the seat bottom 18 and in the same in use arrangement. In all of the figures herein, the outline of the car seat 10 is shown in somewhat of a phantom view or in a simplified form so as to readily show the harness system and harness tensioning components.

With reference to FIGS. 1 and 2, the car seat 10 employs one example of a harness tensioning device, i.e., a harness tensioner 60 in accordance with the teachings of the present disclosure. The harness tensioner 60 is mounted to the back side 20 of the seat back 18 in this example. FIGS. 2 and 3 show the various components of the harness tensioner 60. In one example, the disclosed harness tensioner 60 has an upper toggle lever or upper part 62 that is pivotally coupled to an upper pivot axis A. The upper pivot axis is created by an upper rod or axle 64 in this example that extends laterally between the supports 32 behind the seat back 18. The harness tensioner 60 also has a lower toggle lever 66 or lower part that is pivotally mounted on a pivot axis B below the upper pivot axis A. The lower pivot axis B is created in this example by a lower rod or axle 68 that extends laterally between the supports 32 behind the seat back 18. Each of the pivot rods or axles 64, 68 is oriented generally horizontally relative to the car seat 10 and seat back 18.

In this example, the lower part or lower toggle lever 66 has a first portion or lower leg 70 below the pivot axis B and a second portion or upper leg 72 above the pivot axis B. The legs 70, 72 of the lower toggle lever 66 can therefore toggle fore-and-after about the horizontal pivot axis B defined by the lower pivot rod 68. The upper part or upper toggle lever 62 of the harness tensioner 60 also has a first portion or lower leg 74 that positioned below the upper pivot axis A and a second portion or upper leg 76 that is positioned above the upper pivot axis A. As shown in FIG. 3, the vertical spacing between the upper and lower rods 64, 68, and the length of the lower leg 74 of the upper toggle lever 62 and the length of the upper leg 72 of the lower toggle lever 66 are configured to create interference between the upper and lower toggle levers. Specifically, the free end 78 of the lower leg 74 (on the upper part 62) and the free end 80 of the upper leg 72 (on the lower part 66) interfere with one another. In this example, the free end 78 of the upper toggle lever part 62 is also positioned forward of the free end 80 of the lower toggle part 66 as well.

With reference to FIG. 2, a fixed bracket 84 is positioned between the two sturdy structural elements or supports 32 on the seat back 18 of the car seat 10. The fixed bracket 82 is positioned near a free end 84 of the lower leg 70 on the lower toggle lever 66. A strong biasing element is defined by, carried by, or mounted to the fixed bracket 82. The biasing element extends forward to contact a portion of the free end 84 of the lower leg 70 on the lower toggle lever 66. In this example, the biasing element is a heavy compression spring 86 positioned between the fixed bracket 82 and the free end 84 of the lower leg 70. The spring 86 extends forward from the bracket 82 toward the seat back 18 in this example.

The toggle levers 62, 66 can vary in configuration and construction and yet function as intended. This will become evident upon reviewing the several embodiments disclosed herein. In this example, the upper part or toggle lever 62 has two U-channel sections 90 that are spaced laterally apart from one another. The U-channel cross-section shape of the sections 90 imparts strength and rigidity to the toggle lever 62. Each section 90 is pivotally connected to the pivot rod 64. Each U-channel section 90 has an upper portion above the pivot axis A that defines part of the upper leg 76; the upper leg 76 being essentially the combination of the two upper portions of the two sections 90. The upper portions of the two sections 90 are fixed to one another by a cross-bar 92 to add strength and stiffness to the structure of the upper toggle lever 62. Each U-channel section 90 also has a lower portion below the pivot axis A that defines part of the lower leg 74; the lower leg being essentially a combination of the two lower portions of the U-channel sections 90.

Figure 4:
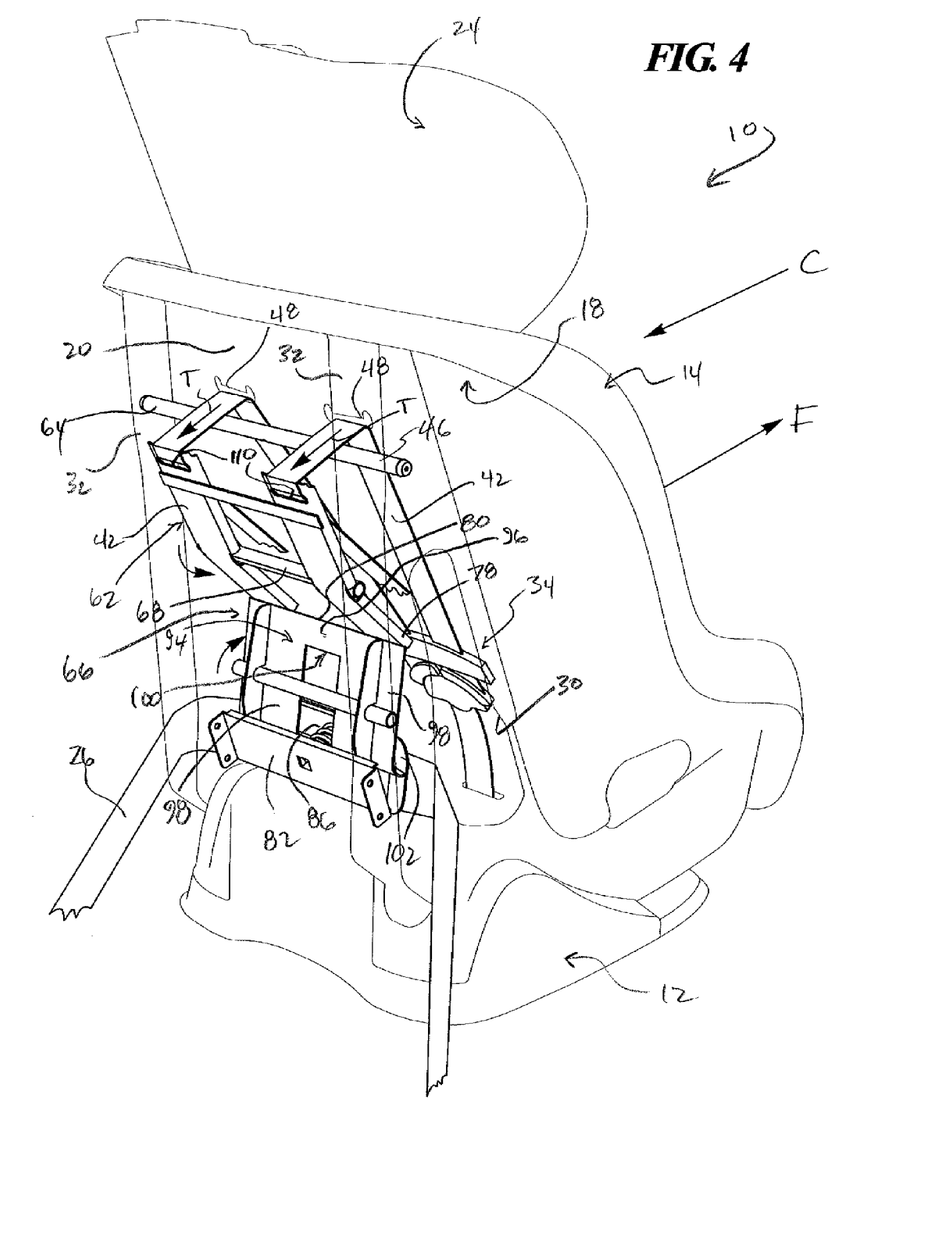
FIG. 4 shows a rear perspective view of the car seat and the harness system and harness tensioning device of FIG. 2 but with the harness tensioning device in an activated configuration.
Figure 5:
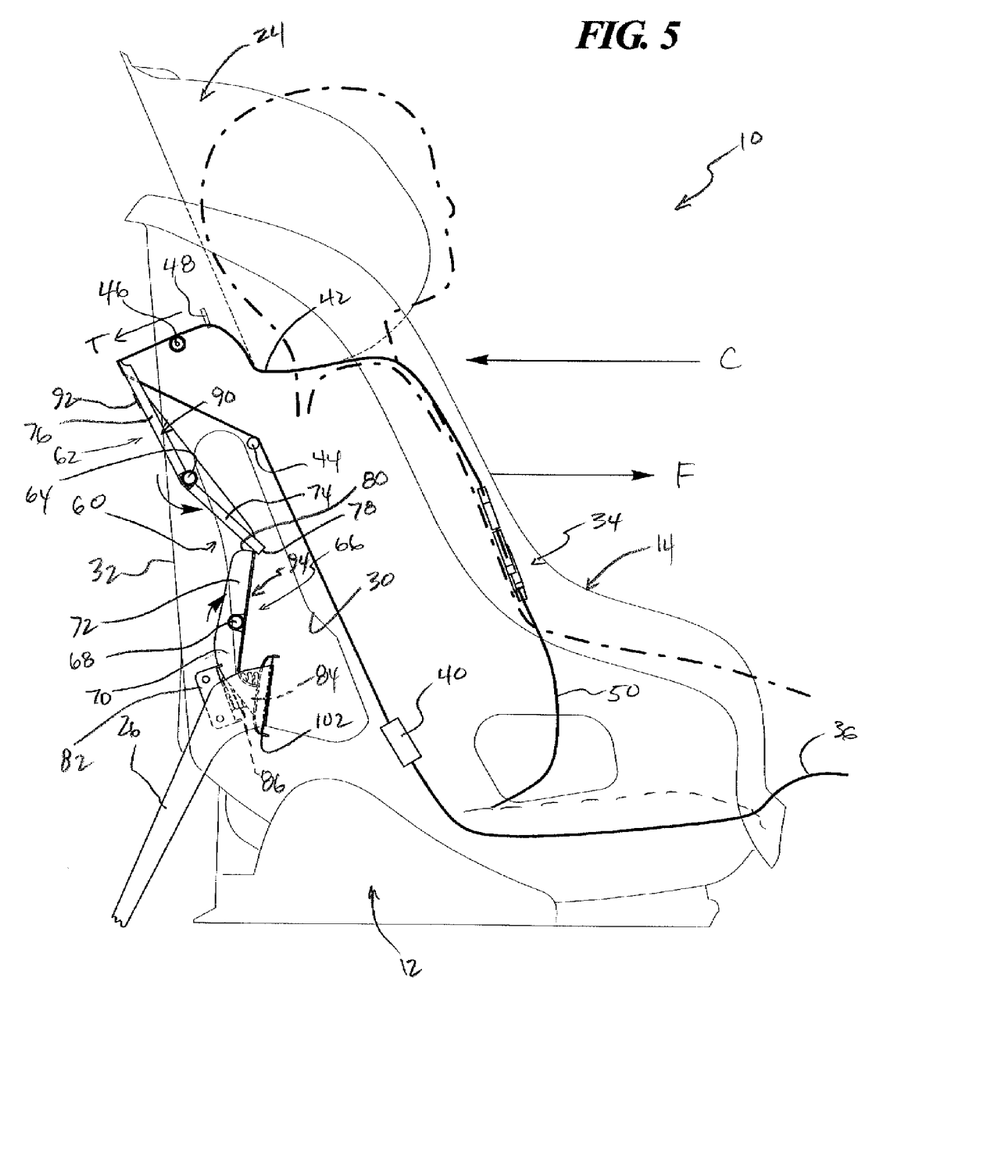
FIG. 5 shows a side view of the car seat of FIG. 3 but with the harness tensioning device in the activated configuration of FIG. 4.

In this example, the lower part or toggle lever 66 has an inverted U-shaped plate 94 as shown in FIGS. 2 and 4. The plate 94 has a transverse top segment 96 and two depending side elements or segments 98 that extend downward from the top segment. The two side segments 98 are spaced apart and form a gap 100 between them. The spring 86 is positioned between the two side segments 98 in the gap 100. The lower ends of the two side segments 98 are curved forward in this example (see FIG. 2). The curved lower ends carry a contact or pressure pad that extends across the U-shaped plate between the two side segments 98. The contact or pressure pad 102 is positioned forward of the rest of the top segment 96 and side segments 98 on the lower toggle lever 66. The spring 86 is in contact with the back face of the contact or pressure pad 102, biasing the pad and the lower leg 70 forward about the pivot axis B. The lap belt 26 of the vehicle harness strap is received over the contact or pressure pad 102 when the car seat 10 is anchored to the vehicle seat, as shown in FIGS. 1-3.

The harness tensioner 60 is shown in the relaxed state, i.e., the normal arrangement or non-activated state in FIGS. 1-3. In this relaxed or non-activated state, the lower leg 70 of the lower toggle lever 66 is biased forward toward the seat back 18. The biasing element, i.e., the spring 86 in this example is a relatively strong or heavy spring, spring mechanism, biasing mechanism, or the like in order to retain the harness tensioner 60 in this state or arrangement under normal vehicle operating conditions. Such a biasing element can be a torsion spring associated with the lower pivot rod 68 or can be some other type of compression spring or biasing mechanism associated with the lower part itself. The intent is for the lower part or toggle lever 66 to remain in this relaxed or non-activated state unless the vehicle in which the car seat 10 is installed experiences an impact event or crash. Thus, the spring 86 or other biasing element should be substantially sturdy. It is not intended that the lower part or toggle lever 66 move or pivot from this relaxed or non-activated state either when the seat is being installed in the vehicle or when the vehicle decelerates under normal braking conditions. In the relaxed or non-activated state or condition, the upper leg 72 of the lower part or toggle lever 66 is pivoted rearward behind and away from the back side of the seat back in this example.

The biasing element can act in the opposite direction on the upper leg 72 of the lower toggle lever 66, if desired. It is also possible that the biasing element or mechanism interacts at least in part directly with the upper toggle lever 62 in order to bias the lower leg 74 rearward and the upper leg 76 forward. It is also possible that the biasing element or mechanism only interacts directly with the upper toggle lever 62 to maintain the relaxed or non-activated state of the harness tensioner 60. Is also possible that the biasing element or mechanism interacts only directly with the lower toggle lever 66 or interacts in part directly with both the upper and lower toggle levers 62, 66 in biasing the harness tensioner 60 to the relaxed or non-activated state. If interacting only with the lower part or toggle lever 66, it is also possible that the upper part or toggle lever 62 is pivotally free-floating on the upper pivot rod 64 when the biasing element or mechanism is in the relaxed state. In such an example, the upper toggle lever 62 would be free to move under normal circumstances and operating conditions for the car seat 10.

As shown in FIG. 2, the upper leg 76 of the upper part or toggle lever 62 has shoulder strap slots 110, one formed in each of the U-channel sections 90. The strap slots 110 align with the slots 48 in the seat back 18. The shoulder straps 42 of the child seat harness system 34 are routed upward from the splitter plate 40 and through the strap slots 110 in the upper toggle lever 62 from front to back. The shoulder straps 42 turn sharply and are then routed over the top of the toggle lever 62 and then forward again over the upper guide bar 46. The shoulder straps 42 are then routed through the slots 48 in the seat back 18 to the front side of the seat shell 14. As shown in FIGS. 1 and 3, the strap connectors 54 are connected to the crotch strap buckle or latch 52 to secure the child seat harness system 34. In this manner, the shoulder straps 42 are coupled to the upper toggle levers 62 but are free to slide relative to the levers. When one is adjusting tension in the harness system 34 for instance, the shoulder straps can slide relative to the levers 62.

When the disclosed child safety seat 10 is installed in the vehicle, the lap belt of the vehicle's dedicated safety harness 34 is routed over the contact or pressure pad 102. In one example, the contact or pressure pad 102 can include a positive lap belt retention aspect, registering aspect, or at least some type of recess or groove that helps align the lap belt 26 with the front face of the pad. As shown in FIG. 3, the front face of the contact or pressure pad 102 can be U-shaped in cross-section to create a recessed path or guide function for the lap belt 26.

When a child is seated in the car seat 10, the shoulder straps 42 pass under the headrest 24, over the child's shoulders, and then down along their chest. The crotch strap 50 is positioned between the child's legs. The adjuster strap 36 can be pulled forward from the front of the seat bottom 16 to adjust the tension in the harness system 34, as is known in the art. The headrest position can also be adjusted to properly position the shoulder straps 42 relative to the child's shoulder height. FIG. 3 shows a child seated in the car seat 10 and secured by the harness system 34. The harness tensioner 60 is in the relaxed, non-activated state or normal operating arrangement.

FIGS. 3 and 4 show the harness system 34 in the activated state or arrangement during a frontal crash or impact event. In this example, the vehicle is traveling in the direction of the arrow F and the crash or impact occurs in the direction of the arrow C. The vehicle will decelerate extremely quickly resulting in forward acceleration in the arrow F direction of the child safety seat 10 away from the dedicated vehicle seat. However, the lap belt 26 of the vehicle's harness strap will restrain the child safety seat in position against the vehicle seat. Under such a high load condition, the child safety seat 10 will place the vehicle's lap belt under extreme tension. The tension in the lap belt 26, which lies over the contact or pressure pad 102, restrains the lower leg 70 of the lower toggle lever 66 as the car seat will still try to move forward. The lap belt 26 thus, in effect, pushes the lower leg 70 in a rearward direction against the heavy compression spring 86 and overcoming the spring bias. The lower toggle lever 66 thus pivots about the lower pivot rod 68.

The intent is for the biasing element or spring mechanism, i.e., the spring 86 to yield at some predetermined impact force so that, during impact, the lower toggle lever 66 will pivot in the manner depicted in FIGS. 3 and 4. When the tension of the lap belt overcomes the biasing force of the spring 86, the lower leg 70 moves rearward and the upper leg 72 pivots forward. The upper leg 72 of the lower toggle lever 66 in turn pushes the lower leg 74 of the upper toggle lever 62 forward, pivoting the upper toggle lever about the upper pivot rod 64. The upper toggle lever 62 pivot motion results in the upper leg 76 pivoting rearward away from the seat back 18 in the direction of the arrows T in FIG. 4.

As the upper toggle lever 62 pivots in this manner, the shoulder harness straps 42, which are routed through the strap slots 110 in the upper ends of the upper toggle lever 62, are pulled rearward in the direction of the arrows T. This sudden motion upon impact will apply rearward tension to the shoulder straps 42 in the T arrow direction. This additional tension in the shoulder straps 42 of the harness system 34 on the car seat 10 assists in reducing forward excursion of the child's body. This reduces forward head excursion of the child seat occupant restrained by the shoulder straps 26 and the safety harness system 34 of the child safety seat 10.

Figure 6:
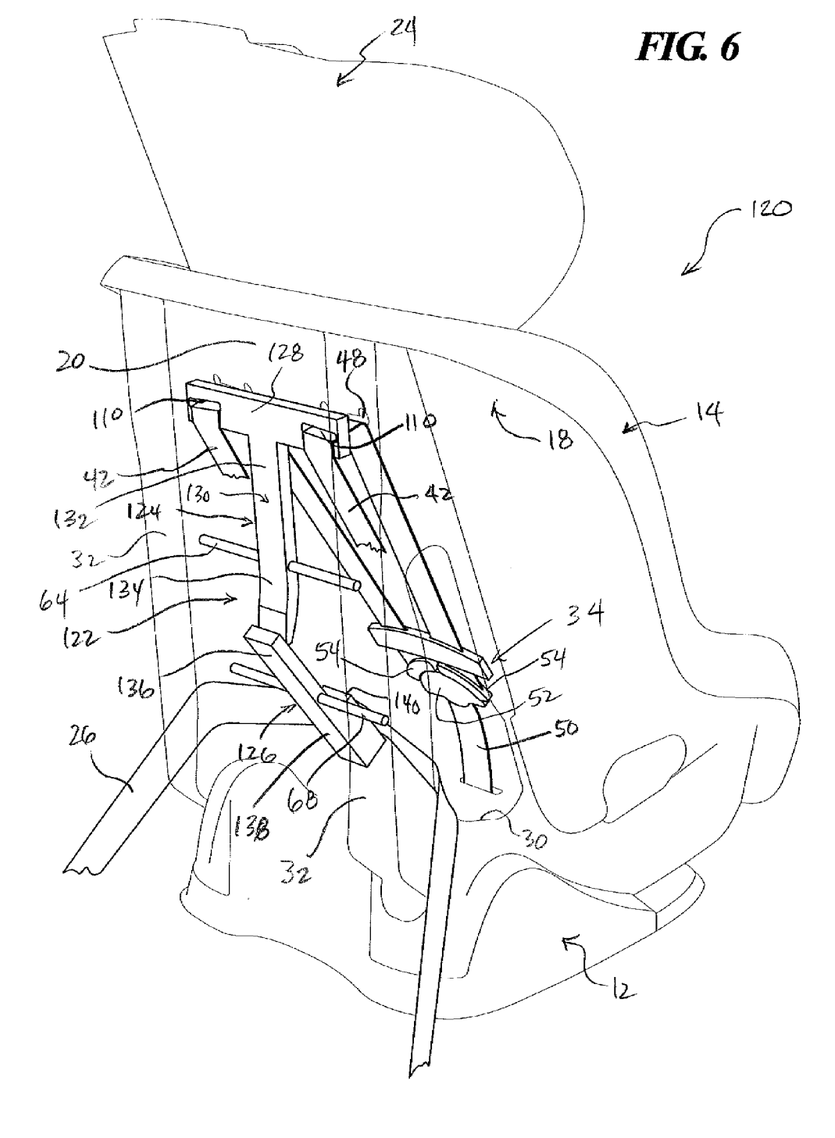
FIG. 6 shows a rear perspective view of a car seat and a harness system with another example of a harness tensioning device constructed in accordance with the teachings of the present disclosure and with the harness tensioning device in a normal operating configuration.
Figure 7:
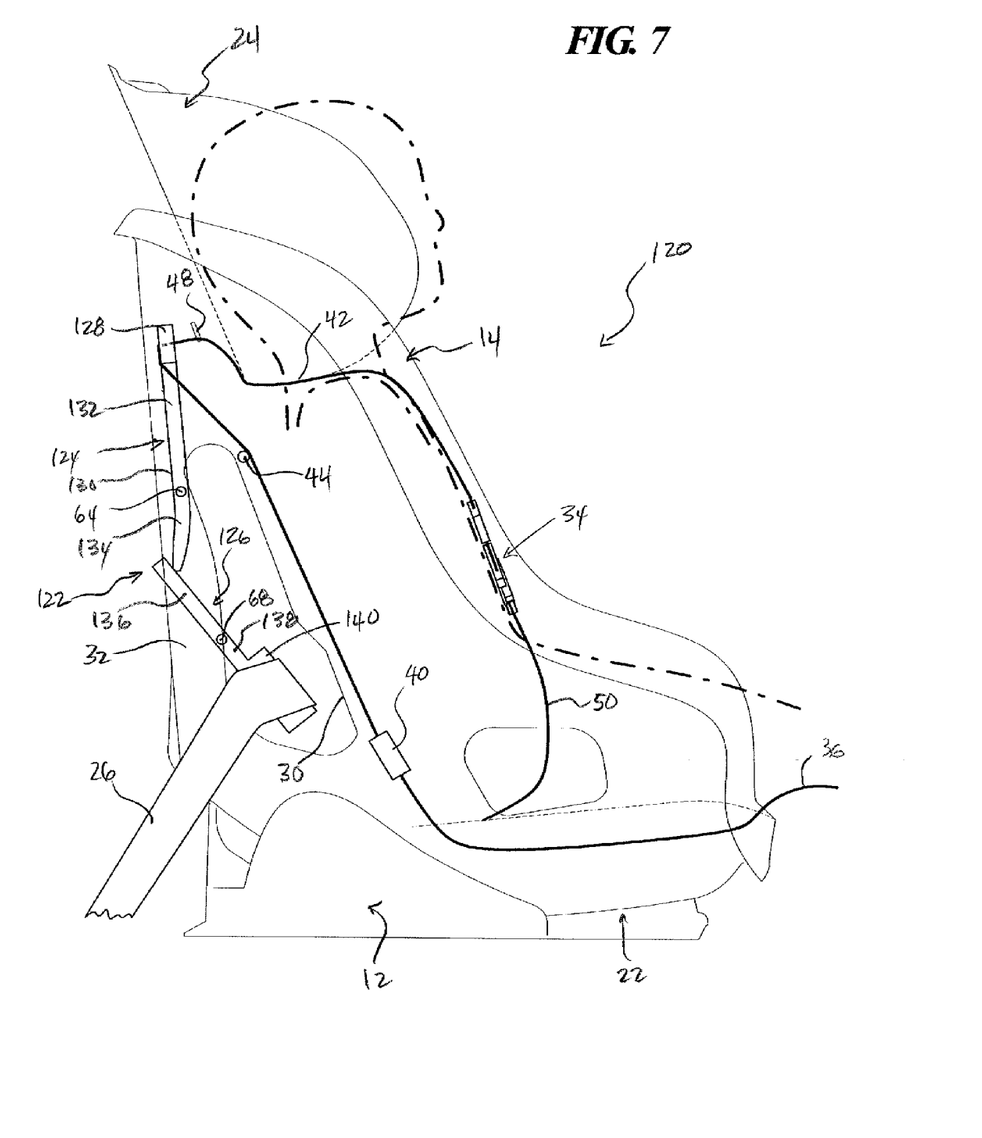
FIG. 7 shows a side view of the car seat of FIG. 6 with a child seated in the seat and the harness system and harness tensioning device in the normal operating configuration.
Figure 8:
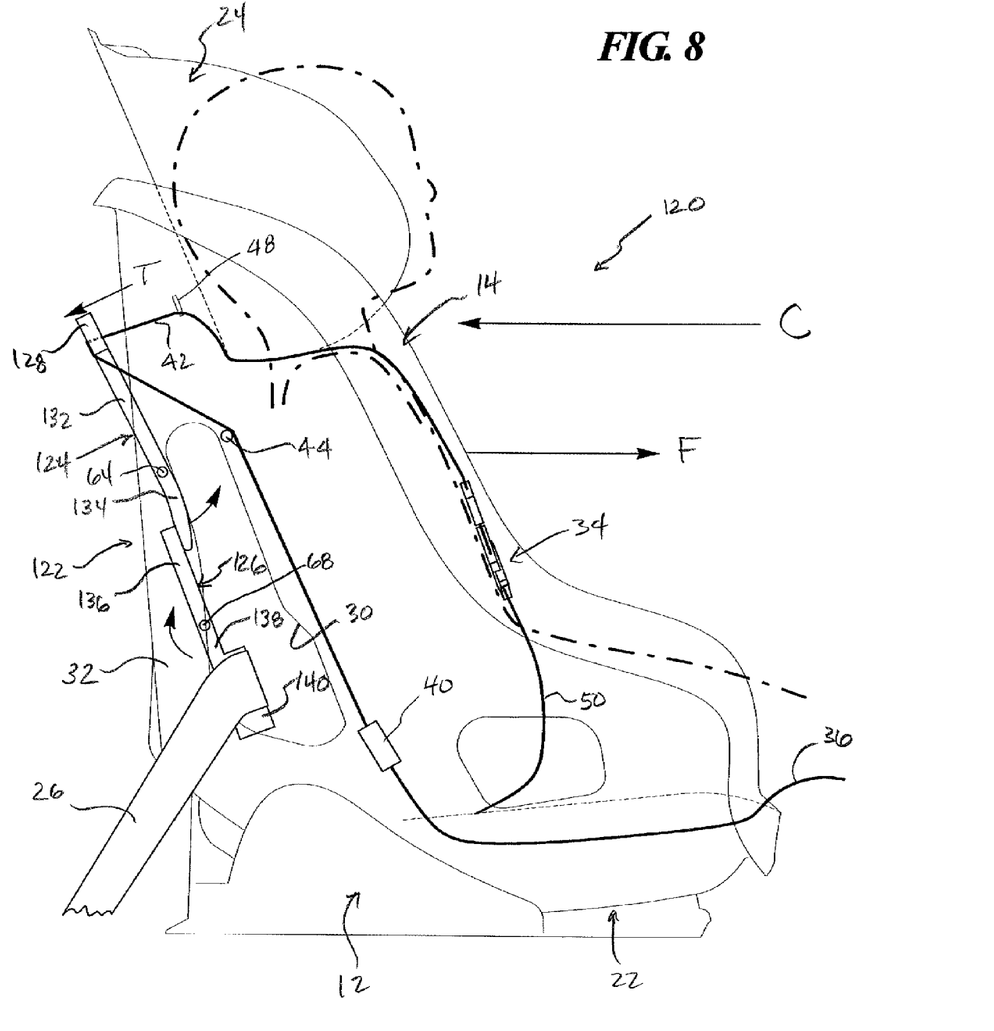
FIG. 8 shows a rear perspective view of the car seat and the harness system and harness tensioning device of FIG. 6 but with the harness tensioning device in an activated configuration.

FIGS. 6-8 show another example of a child seat 120 constructed in accordance with the teachings of the present disclosure. In this example, like reference numerals represent like parts when comparing the two car seats 10, 120. The difference in the two examples lies primarily in the shape, configuration, and relative arrangement of the toggle levers. A harness tensioner 120 in this example functions in precisely the same way as the tensioner 60 in the above-described example. This alternate example is provided to illustrate that various changes can be made to the parts and arrangement of the harness tensioner components without departing from the spirit and scope of the present disclosure. In this example, the harness tensioner 122 has an upper toggle lever 124 pivotally mounted to the seat back 18 on an upper pivot rod 64. The harness tensioner 122 has a lower toggle lever 126 pivotally mounted to the seat back 18 by a lower pivot rod 68.

There is no upper guide bar 46 in this example, showing that such belt guide features are optional. If utilized, such belt guides can vary in configuration and construction as well. There is also no fixed bracket 82 and no spring 86 shown. A biasing element (not shown) can be provided to bias the lower toggle lever 126 in the same manner as the earlier example. Alternatively, a biasing element can be provided at the axis B of the lower pivot rod 68 between the rod and the lower toggle lever 126.

The upper toggle lever 124 in this example has a simplified construction with solid rectangular cross-section elements. The upper toggle lever 124 has a T-shaped configuration with a transverse top element 128 and a single central element 130. The top element carries a pair of strap slots 110, one at each end for receiving the shoulder straps 42. The central element 130 depends from the middle of the top element 128. The pivot rod 64 extends through the central element 130 dividing the element into an upper leg 132 above the rod and a lower leg 134 below the leg.

The lower toggle lever 126 is a single bar also having a solid rectangular cross-section. The lower pivot rod 68 passes through the bar dividing it into an upper leg 136 above the rod and a lower leg 138 below the bar. The top end of the upper leg 136 interferes with and is positioned behind the bottom end of the lower leg 134 of the upper toggle lever 124, as shown in FIGS. 6 and 7. The arrangement of the toggle levers 124, 126 is similar to that of the tensioner 60, but the various angles and relative positions of the legs are different. Also, in this example, the legs of each toggle lever include on a single element. In the prior example, the legs of each toggle lever comprised two spaced apart elements. The front face at the bottom end of the lower leg 138 is provided with a contact surface or pad 140 that protrudes forward from the leg.

In this example, the upper pivot rod 64 is positioned closer to the bottom end of the upper toggle lever 124 than in the prior example. This illustrates that the mechanical advantage of the various components of the harness tensioners 60, 122 can be altered for particular applications. FIGS. 6 and 7 show the harness tensioner 122 in the relaxed or non-activated state or a normal arrangement. The arrangement of the toggle levers 124, 126 is essentially the same as that of the toggle levers 62, 66 of the prior example. The lower toggle lever 126 is pivoted by the unseen biasing mechanism so that the lower leg 138 is forward and the upper leg 136 is rearward. The upper toggle lever 124 can again be free floating in this example but the harness straps 42 will again pull the top element 128 and upper leg 132 forward. The lower leg 134 will thus be positioned rearward and in contact with the upper leg 136 of the lower toggle element 126.

FIG. 8 shows the harness tensioner 122 in the activated state or arrangement during a crash or impact event. The impact is in the direction of the arrow C and the forward excursion of the car seat 120 and the child seat occupant is in the direction of the arrow F. The lap belt 26 will apply pressure against the contact or pressure pad 140 with the forward momentum of the car seat 120. This will effectively push the lower leg 138 of the lower toggle lever 126 rearward and pivot the upper leg 136 forward. This in turn pushes the lower leg 134 of the upper toggle lever forward and thus the upper leg 132 rearward. This action again pulls the shoulder straps 42 rearward in the direction of the arrow T, increasing tension in the shoulder straps.

The relative lengths of the legs on the toggle levers in either example can be designed to produce a desired degree of movement at the shoulder straps per degree of movement at the lap belt contact point. The leg lengths in combination with the force required to overcome the biasing mechanism can be designed so that shoulder strap tensioning occurs only after a predetermined minimum load is applied at the contact or pressure pad.

In one example, these interfering ends of the toggle lever legs can be pivotally connected to one another instead of just lying against one another as in the disclosed examples. Also, some play can be designed into one or more of the pivot points of the harness tensioner components in order to prevent the joined parts from locking up or binding. This may be so that the physical connection between the toggle levers can be maintained as both parts pivot during an impact event.

Figure 9:
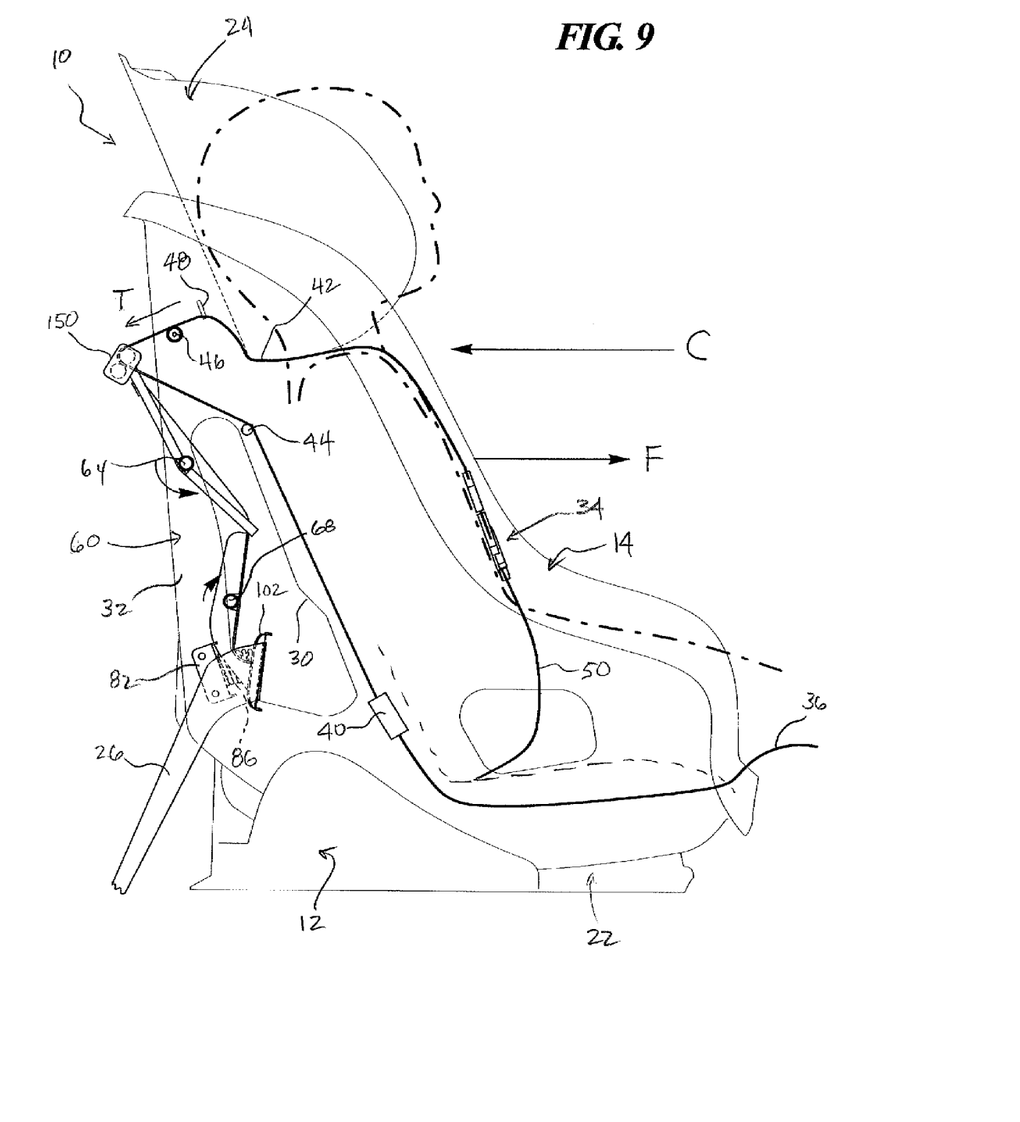
FIG. 9 shows a side view of a car seat with a harness system and another example of a harness tensioning device constructed in accordance with the teachings of the present disclosure and with the harness tensioning device in the activated configuration.

In each of the foregoing examples, the shoulder straps 42 are routed through the strap slots 110 in the upper toggle levers. However, the belts are otherwise not connected in any way to the levers. The shoulder straps 42 may thus slide relative to the levers during an impact event or crash, potentially reducing the effectiveness of the disclosed harness tensioners. In the foregoing examples, the sharp turn of the straps around the tops of the levers will result in the shoulder straps being pulled rearward, but they may slide relative to the levers in doing so. FIG. 9 shows one generic example of how one might address this potential difficulty. FIG. 9 depicts the car seat 10 of FIG. 5 with the harness tensioner 60 in the activated state or arrangement. The only modification in this example is to provide a belt clamping device 150 at the top end of the upper toggle lever at each strap slot 110. During a crash event, the belt clamping devices are intended to grab and hold the shoulder straps when the upper leg 76 moves rearward. The belt clamping devices 150 can prevent the shoulder straps 42 from slipping relative to the toggle lever 62. The configuration and function of the belt clamping devices 150 can vary. The devices can function similar to existing shoulder strap locks on vehicle harness systems whereby they are activated upon reaching a predetermined belt acceleration through the device. Alternatively, the devices 150 can be configured to allow belt movement through the device with the strap at one angle but prevent strap movement with the strap at a different angle through the device.

FIGS. 11-14 are photographs of a mockup or prototype of a child car seat constructed in accordance with the teachings of the present invention. FIGS. 11 and 12 depict a lap belt of a vehicle safety harness extending across the seat shell and over the lower leg of a lower part of the harness tensioner. FIG. 13 shows a rear view of the mockup or prototype of the harness tensioner from the back side of the seat back and FIG. 14 shows a front view of the harness tensioner from the front side of the seat back.

As will be evident to those having ordinary skill in the art, changes and modifications can be made to the disclosed examples of a harness tensioner. Changes to the length, size, shape, and construction of the upper and lower parts can be made and yet the harness tensioning function of the invention can be maintained. Likewise, as is apparent from the two different examples disclosed herein, the connection between the upper and lower part can be varied and the location of the pivot axis for each of the parts can also be varied, depending on the strength of the components, the desired mechanical advantage for a particular seat application, and the like.

The disclosed harness tensioner employs two opposing mechanical levers that "teeter-totter" when activated by an impact event. The levers mechanically move when the vehicle lap belt is under extreme stress restraining the car seat during a crash. This in turn pulls on and applies tension in the opposite direction to the harness shoulder straps that hold the child.

As noted above, a separate mechanism may also be used to 'grab' the harness in the upper part. The mechanism can, for example, employ 'alligator teeth' or dual rollers that are used on some car seat harness adjustment devices Although certain car seats, harness tensioners, and tensioner components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A harness tensioner for a child safety seat, the harness tensioner comprising:
   a lower lever part pivotable about an axis;
   an upper lever part above the lower lever part and pivotable about a different axis;
   a lower portion of the upper lever part in contact with an upper portion of the lower lever part;
   harness straps of a child safety seat coupled to the upper lever part; and
   wherein, upon an impact event, the lower part is moved against a biasing force, which in turn moves the upper part to apply rearward tension to the harness straps.

2. A harness tensioner according to claim 1, wherein the upper lever part is an upper toggle lever pivotally mounted on an upper pivot rod and wherein the axis is an upper horizontal pivot axis defined by the upper pivot rod.

3. A harness tensioner according to claim 2, wherein the upper toggle lever has two U-shaped channel sections that are laterally spaced apart, each U-shaped channel section having a strap slot near a top end, the harness straps routed through the strap slots.

4. A harness tensioner according to claim 1, wherein the lower lever part is a lower toggle lever pivotally mounted on a lower pivot rod and where the different axis is a lower horizontal pivot axis defined by the lower pivot rod.

5. A harness tensioner according to claim 1, the upper lever part comprising:
   an upper leg above the axis;
   a lower leg below the axis; and
   strap slots near a top end of the upper leg, the harness straps routed through the strap slots.

6. A harness tensioner according to claim 5, wherein the upper lever part is an upper toggle lever pivotally mounted on the axis and having two U-shaped channel sections that are laterally spaced apart, the upper leg defined by an upper portion of each U-shaped channel section above the axis and the lower leg defined by a lower portion of each U-shaped channel section below the axis, one of the strap slots provided in the upper portion of each U-shaped channel section.

7. A harness tensioner according to claim 1, the lower lever part comprising:
   an upper leg above the different axis;
   a lower leg below the different axis; and
   a pressure pad provided on the lower leg, the vehicle harness belt arranged to contact the pressure pad.

8. A harness tensioner according to claim 7, wherein the lower lever part is a lower toggle lever pivotally mounted on the different axis and having a top segment extending between and connecting respective top ends of two laterally spaced apart side segments, the pressure pad connected to and extending between respective lower ends of the two side segments.

9. A harness tensioner according to claim 1, further comprising a biasing mechanism in contact with one of the upper and lower lever parts and providing the biasing force.

10. A harness tensioner according to claim 9, wherein the biasing mechanism is a compression spring with one end in contact with a fixed plate and an opposite end in contact with a portion of the lower lever part.

11. A harness tensioner according to claim 1, wherein a vehicle harness belt of a vehicle is coupled to the lower part and the lower part is moved by the vehicle harness belt during the impact event.

12. A harness tensioner for a child safety seat, the harness tensioner comprising:
   two levers pivotally mounted to a car seat;
   harness shoulder straps coupled to one of the two levers; and
   a biasing mechanism biasing the harness tensioner to a relaxed state,
   whereby the other of the two levers is moved to an activated state upon an impact event which in turn moves the one of the two levers thereby applying tension to the shoulder straps.

13. A harness tensioner according to claim 12, wherein the one lever is an upper toggle lever mounted on a horizontal upper pivot rod and the other lever is a lower toggle lever mounted on a horizontal lower pivot rod below the upper toggle lever, the vehicle harness straps coupled to an upper leg of the upper toggle lever.

14. A harness tensioner according to claim 13, wherein a lower leg of the upper toggle lever is in contact with an upper leg of the lower toggle lever and the biasing mechanism contacts a lower leg of the lower toggle lever.

15. A harness tensioner according to claim 12, wherein the biasing mechanism is a spring mounted between two segments of a lower leg of the other lever.

16. A harness tensioner according to claim 12, wherein a vehicle seat harness strap is coupled to the other of the two levers and moves the other of the two levers as a result of the impact event.

17. A child safety seat comprising:
   a seat shell;
   a harness system with shoulder straps;
   a lower lever part mounted to the shell and pivotable about a lower axis;
   an upper lever part mounted to the shell above the lower lever part and pivotable about an upper axis above the lower axis;
   a lower leg of the upper lever part and an upper leg of the lower lever part in contact with one another; and
   a vehicle harness belt coupled to the lower lever part,
   wherein the shoulder straps are coupled to the upper lever part whereby, upon an impact event, the vehicle harness belt moves the lower lever part against a biasing force, which in turn drives movement of the upper lever part to apply tension to the shoulder straps.

* * * * *